(12) United States Patent
Cho

(10) Patent No.: US 11,544,332 B2
(45) Date of Patent: Jan. 3, 2023

(54) BIPARTITE GRAPH CONSTRUCTION

(71) Applicant: Gregory Cho, Providence, RI (US)

(72) Inventor: Gregory Cho, Providence, RI (US)

(*) Notice: Subject to any disclaimer, the term of this patent is extended or adjusted under 35 U.S.C. 154(b) by 423 days.

(21) Appl. No.: 16/786,976

(22) Filed: Feb. 10, 2020

(65) Prior Publication Data

US 2021/0248193 A1     Aug. 12, 2021

(51) Int. Cl.
*G06F 16/953* (2019.01)
*G06F 16/901* (2019.01)
*G06F 17/16* (2006.01)
*G06F 17/18* (2006.01)
*G06F 16/906* (2019.01)

(52) U.S. Cl.
CPC ......... *G06F 16/953* (2019.01); *G06F 16/906* (2019.01); *G06F 16/9024* (2019.01); *G06F 17/16* (2013.01); *G06F 17/18* (2013.01)

(58) Field of Classification Search
CPC ... G06F 16/953; G06F 16/906; G06F 16/9024
See application file for complete search history.

(56) References Cited

U.S. PATENT DOCUMENTS

| 2012/0052380 A1* | 3/2012 | Nakamura | H01M 4/70 228/173.6 |
| 2019/0087480 A1* | 3/2019 | Palanciuc | G06F 16/9024 |
| 2021/0150568 A1* | 5/2021 | Farhadi | G06F 16/9024 |

* cited by examiner

*Primary Examiner* — Baoquoc N To
(74) *Attorney, Agent, or Firm* — Stephen T. Neal

(57) ABSTRACT

In one embodiment, a matching service that executes an optimized search engine to match two sets of data items. A client input of the optimized search engine may receive an incoming data item from a client device. An edge reader may determine a cluster qualification level estimate between the incoming data item and a target cluster of target data items. The edge reader may use the cluster qualification level estimate to calculate at least one individual qualification level estimate between the incoming data object and at least one target data object of the target cluster. A report generator may generate a report ranking target data item options based on the at least one individual qualification level estimate. A client output of the optimized search engine may send the report to the client device.

20 Claims, 18 Drawing Sheets

300

800 ic description is set forth and will be rendered
BIPARTITE GRAPH CONSTRUCTION

BACKGROUND

A search engine allows a user to sort through a vast amount of data to identify items of interest. A search engine can use a variety of methods to identify those items. For example, a user can provide a set of search terms describing the type of data the user is seeking. The search engine may search each data item for the presence of those search terms or synonyms thereof. Alternately, the search engine can use a priority ranking system that selects data items based upon links from other data items, with the assumption that the more links to the data item, the more important the data item is.

The task of the search engine is very complex when searching a single, limited set of data items. A harder task is searching for a set of data items that is constantly changing, with new data items added and removed at a variable rate. This task becomes significantly harder when search results are to be tailored to each user, as in the case of a dating site or a labor market.

For example, data collected by the Bureau of Labor Statistics over the last 11 years shows a persistent rise in frictional unemployment, despite the advent of job boards and social networking platforms. This rise indicates a strong signal for market inefficiency. Economic research has attributed this decrease in efficiency to automation, rapid labor supply influx, and decreased market transparency. Surprisingly, while job boards and social media platforms often seek to aid in increasing user market exposure, recent research shows that such resources when implemented alone persistently lead to a tragedy of the commons and do not aid in the formation of optimal pairings. These factors have led to a general decline in social welfare as job openings now take longer and are more difficult or expensive to fill. Labor supply is affected as well, as people now find it more challenging to find appropriate positions than in previous years, causing increased levels of underemployment.

SUMMARY

This Summary is provided to introduce a selection of concepts in a simplified form. These concepts are further described below in the Detailed Description. This Summary is not intended to identify key features or essential features of the claimed subject matter, nor is it intended to be used to limit the scope of the claimed subject matter.

Embodiments discussed below relate to a matching service that executes an optimized search engine to match two sets of data items. A client input of the optimized search engine may receive an incoming data item from a client device. A streamed clustering module may assign the incoming data item to an incoming cluster of an incoming data item set. An edge reader may consult a bipartite graph to determine a cluster qualification level estimate between the incoming cluster and a target cluster of target data objects. The edge reader may use the cluster qualification level estimate to calculate at least one individual qualification level estimate between the incoming data object and at least one target data object of the target cluster. A report generator may generate a report ranking target data item options based on the at least one individual qualification level estimate. A client output of the optimized search engine may send the report to the client device.

DRAWINGS

In order to describe the manner in which the above-recited and other advantages and features can be obtained, a more comprehensive description is set forth and will be rendered by reference to specific embodiments thereof which are illustrated in the appended drawings. Note that these drawings depict only typical embodiments and are not therefore to be considered to be limiting of its scope. Implementations will be described and explained with additional specificity and detail through the use of the accompanying drawings.

DETAILED DESCRIPTION

Figure 1:
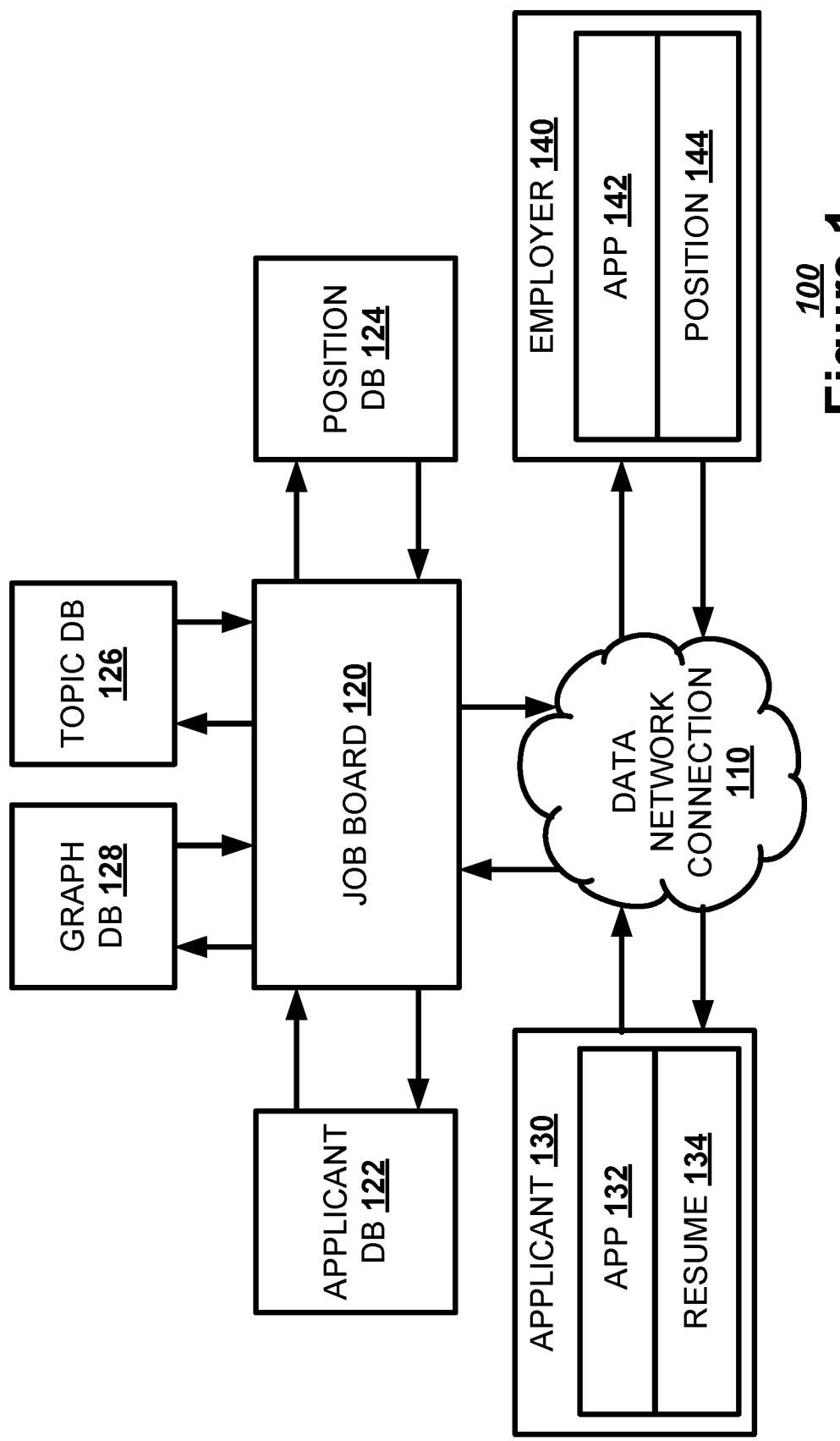
FIG. 1 illustrates, in a block diagram, one embodiment of a network.

Embodiments are discussed in detail below. While specific implementations are discussed, this is for illustration purposes only. A person skilled in the relevant art will recognize that other components and configurations may be used without parting from the spirit and scope of the subject matter of this disclosure. The implementations may be an optimized search engine, a computing device, or a machine-implemented method.

Normally, when using a search engine to search a large set of target data items, a user may enter search criteria into the search engine to identify relevant items from among the set. When seeking to connect two large sets of data items, the task becomes more complex. The search result may return a ranking tailored to the respective user. A matching service, such as a job board or a dating site, can further complicate matters by processing two populations that may be largely in flux.

An optimized search engine for a matching service, such as a job board or a dating site, can use a qualification level estimate (QLE) module to identify the probability of a match between a data item from each set of data items and a streamed clustering module to reduce the number of qualification level estimate calculations executed. The qualification level estimate module may utilize, simple, linear operations and machine learning to assess the qualification level of a member of a first set of data items to match with a member of a second set of data items. The score can condense item attributes into a single variable which indicates match compatibility. In the example of a job board, the attributes may be user skills, education, work experience, and interests. The qualification level estimate module may use computational linguistics to identify a category for specific attributes, such as a user's education and work experience. This category attribution can enable the assignment of "partial points" to profiles that are applicable. The qualification level estimate module may leverage this partial match functionality to "understand" each compatibility attribute of a data item, even those that are implied, resulting in greater human screening fidelity. With regards to optimal pairings, due to the high variability, size, and overall complexity of matching two large variable data set, a direct approach to finding a solution, as is done with traditional matching software, is computationally infeasible. To approximate a solution, the platform may, instead, attempt to customize search and filtering options to ensure that users are able to apply to near optimal positions based on desired qualification level estimate values. In the case of a job board, the match may also factor in required skills, industries, and position titles. The optimized search engine may use these new and comprehensive means of information parsing to result in more optimal pairings.

The optimized search engine may use a streamed clustering module to minimize variability and reduce necessary computations. The streamed clustering module may cluster similar data items upon their creation. The qualification level estimate module is then used to find the qualification level estimate values between each cluster center from the first set of data items, such as resumes, and the second set of data items, such as position descriptions. The optimized search engine may use this stored information to sort and filter position descriptions for users based on the qualification level estimate values of their respective clusters. These assets not only match applicants to jobs more effectively than modern online job boards, but, by reducing screening costs and increasing market transparency, also directly address the labor market inefficiencies such platforms exacerbate or ignore.

FIG. 1 illustrates, in a block diagram, one example of a data network 100. A client can access a matching service via a data connection 110 to create a connection with a different client using the optimized search engine. In one example, the service is a job board 120 to connect applicants 130 with employers 140. The job service 120 may maintain multiple databases to store data items representing the applicants 130 and the employers 140, or maintain a single database partitioned to house multiple types of data items.

An applicant device 130 operating the application 132 to communicate with the job board 120 can post a resume 134 describing the qualifications of the applicant to the job board 120. The job board 120 can store the resume 134 to an applicant database 122.

An employer device 140 operating an application 142 to communicate with the job board 120 can post an open position description 144 describing an available job opening to the job board 120. The job board 120 can store the open position description 144 to an open position database 124.

Upon receiving the resume 134 from the applicant device 130, the job board 120 may consult a topic database 126 to facilitate natural language processing of the resumes 134. The job board may use the topic database 126 to construct a data object to represent the resume during the matching process. The job board 120 may consult a bipartite graph stored in a graph database 128 connecting resumes 134 to the open positions 144. The job board 120 can use the optimized search engine to select position options matching the resume 134. The job board 120 may generate a report describing and ranking the position options to send to the application 132 on the applicant device 130. Depending on the settings for the application 132, the job board 120 can send follow up reports with new position options. The follow up reports can be sent at regular intervals or as new position options are added.

Upon receiving the open position description 144 from the employer device 140, the job board 120 may consult a topic database 126 to facilitate natural language processing of the job openings 144. The job board may use the topic database 126 to construct a data object to represent the job opening during the matching process. The job board 120 may consult a bipartite graph stored in a graph database 128 connecting the open positions 144 to the resumes 134. The job board 120 can use the optimized search engine to select applicant options matching the open position description 144. The job board 120 may generate a report describing the applicant options to send to the application 142 on the employer device 140. Depending on the settings for the application 142, the job board 120 can send follow up reports with new applicant options. The follow up reports can be sent at regular intervals or as new applicant options are added.

Figure 2:
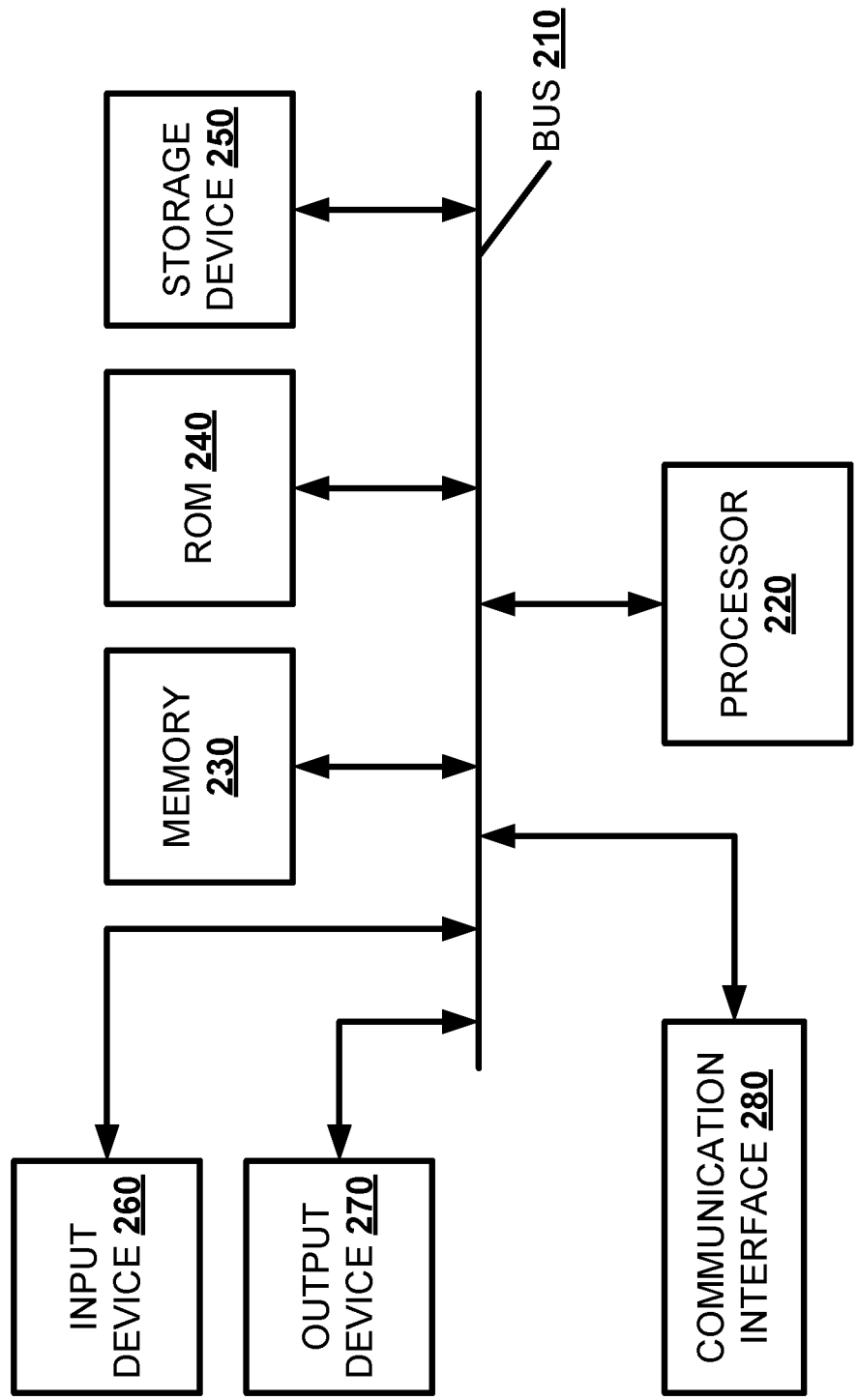
FIG. 2 illustrates, in a block diagram, one embodiment of a computing device.

FIG. 2 illustrates a block diagram of an exemplary computing device 200 which may act as optimized search engine. The computing device 200 may combine one or more of hardware, software, firmware, and system-on-a-chip technology to implement the optimized search engine. The computing device 200 may include a bus 210, a processor 220, a memory 230, a read only memory (ROM) 240, a storage device 250, an input device 260, an output device 270, and a communication interface 280. The bus 210 may permit communication among the components of the computing device 200.

The processor 220 may include at least one conventional processor or microprocessor that interprets and executes a set of instructions. The memory 230 may be a random access memory (RAM) or another type of dynamic storage device that stores information and instructions for execution by the processor 220. The memory 230 may also store temporary variables or other intermediate information used during execution of instructions by the processor 220. The ROM 240 may include a conventional ROM device or another type of static storage device that stores static information and instructions for the processor 220. The storage device 250 may include any type of tangible machine-readable medium, such as, for example, magnetic or optical recording media, such as a digital video disk, and its corresponding drive. A tangible machine-readable medium is a physical medium storing machine-readable code or instructions, as opposed to a transitory medium or signal. The storage device 250 may store a set of instructions detailing a method that when executed by one or more processors cause the one or more processors to perform the method. The storage device 250 may also be a database or a database interface for storing, for example, open position information and applicant resumes.

The input device 260 may include one or more conventional mechanisms that permit a user to input information to the computing device 200, such as a keyboard, a mouse, a voice recognition device, a microphone, a headset, a gesture recognition device, a touch screen, etc. The output device 270 may include one or more conventional mechanisms that output information to the user, including a display, a printer, one or more speakers, a headset, or a medium, such as a memory, or a magnetic or optical disk and a corresponding disk drive. The communication interface 280 may include any transceiver-like mechanism that enables computing device 200 to communicate with other devices or networks. The communication interface 280 may include a network interface or a transceiver interface. The communication interface 280 may be a wireless, wired, or optical interface.

The computing device 200 may perform such functions in response to processor 220 executing sequences of instructions contained in a computer-readable medium, such as, for example, the memory 230, a magnetic disk, or an optical disk. Such instructions may be read into the memory 230 from another computer-readable medium, such as the storage device 250, or from a separate device via the communication interface 280.

Figure 3:
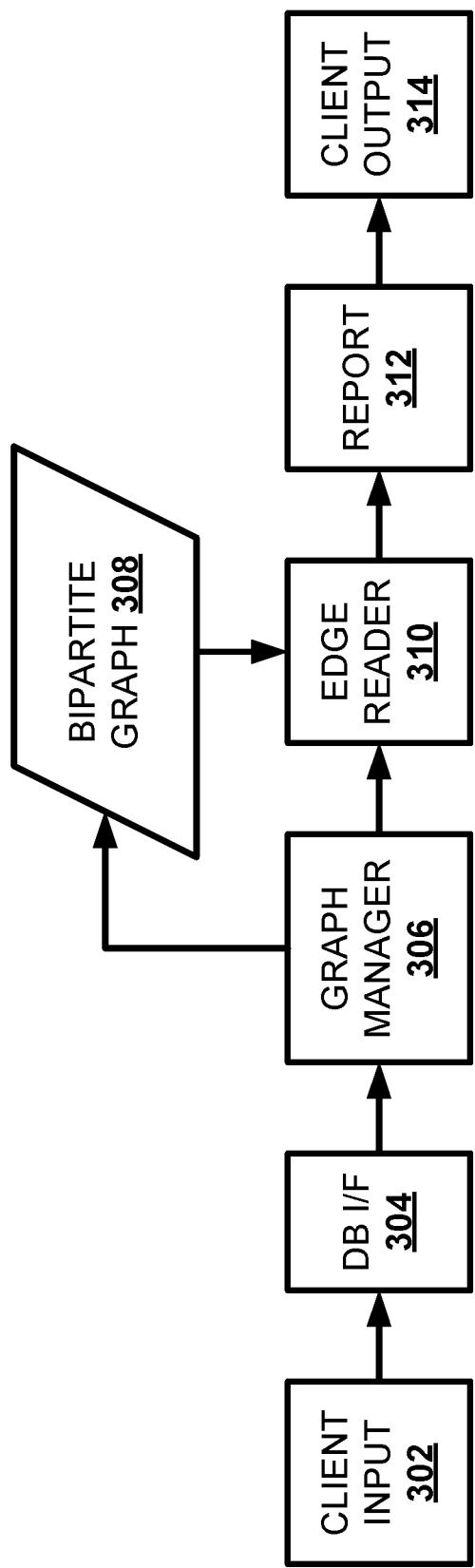
FIG. 3 illustrates, in a block diagram, one embodiment of a search engine.

FIG. 3 illustrates, in a block diagram, one embodiment of a matching service 300 using an optimized search engine. A client input 302 may receive a data item, referred to as an incoming data item, from a client device via a data network. For example, the incoming data item may be a resume from an applicant device or a job description opening from an employer device. A database interface 304 may access a database storing a first set of data items and a second set of data items. The database interface 304 may store the incoming data item with the first set of data items. Thus, the first set of data items may be referred to as the incoming data item set. A graph manager 306 may generate a representative data object to represent the incoming data item. Thus, the representative data object may be referred to as the incoming data object. The graph manager 306 may add the representative data object to a first data object set representing the first set of data items. Thus, the first data object set may be referred to as the incoming data object set. The graph manager 306 may assign the incoming data object to an incoming cluster of incoming data objects from the incoming data object set. The graph manager 306 may use the first data object set and a second data object set representing the second set of data items to construct a bipartite graph 308.

The edge reader 310 may consult the bipartite graph 308 to calculate individual qualification level estimates between the incoming data object and one or more data objects from the second data object set. As the second data object set represents the second set of data items with which the client is seeking a match, the second data object set may be referred to as a target data object set and the second set of data items may be referred to as the target data item set. The second set of data items may be an incoming data item set for a later data item, with the first set of data items acting as the target data item set in that situation. The edge reader 310 may perform these calculations for a subset of the target data object set up to the entire target data object set. The target data object subset refers to the target data objects for which an individual qualification level estimate has been calculated in a given iteration. Thus, the edge reader may consult the bipartite graph to calculate at least one qualification level estimate between the incoming data item and at least one target data item. A report generator 312 may generate a report ranking target data item options based on the individual qualification level estimates. The client output 314 may send the report to the client device. The report generator 312 may further generate a follow up report ranking target data item options triggered by a reporting event, such as an addition of a new target data item. The follow up report may include previously presented target data item options. Alternately, the report generator 312 may filter those target data item options from the follow up report.

Figure 4:
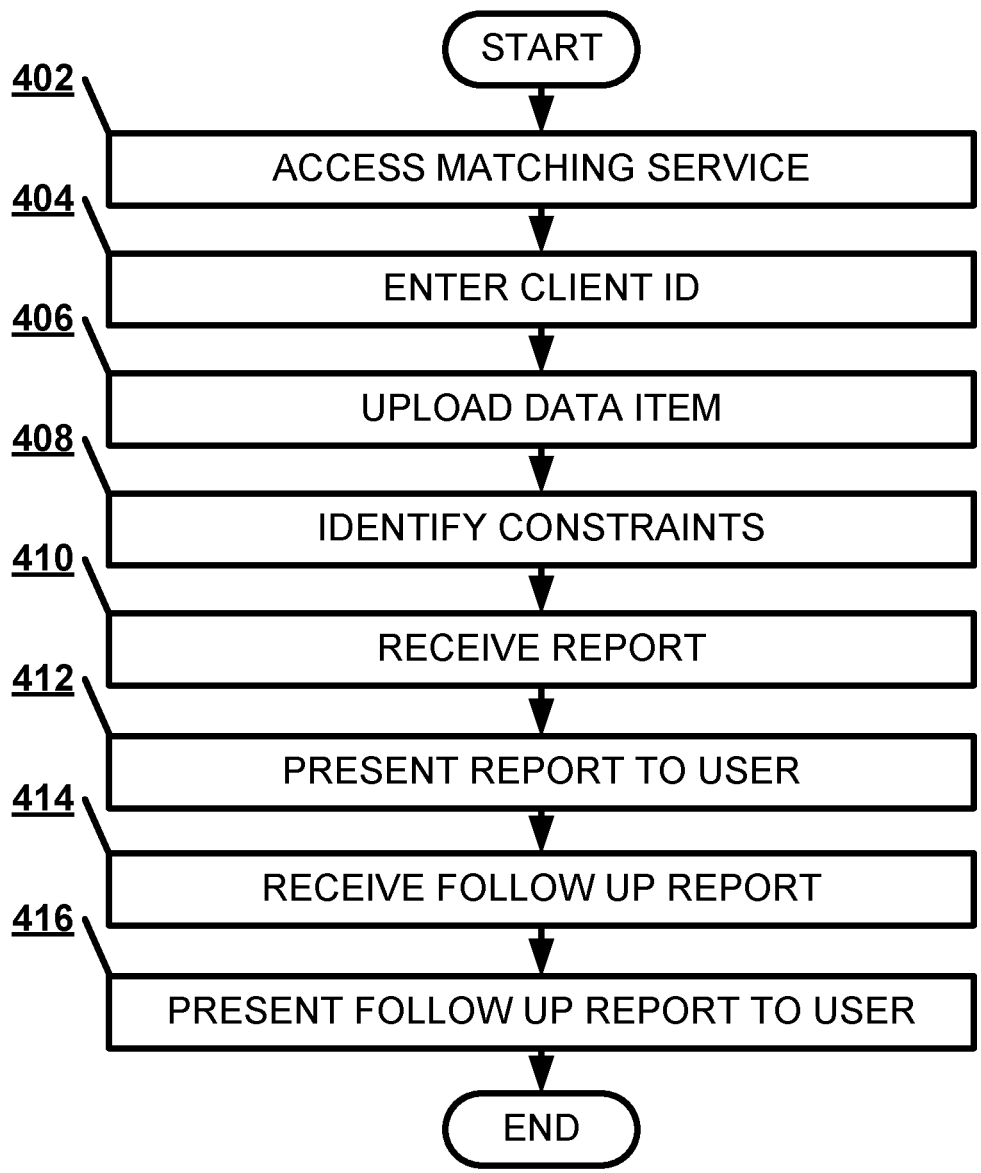
FIG. 4 illustrates, in a flowchart, one embodiment of a method of submitting a data item.

FIG. 4 illustrates, in a flowchart, one embodiment of a method 400 of submitting a data item. A client device may execute a communication application to access the matching service (Block 402). The client device may enter a client identifier into the matching service (Block 404). The client device may upload a data item describing aspects of the client user for matching purposes (Block 406). For example, for a job seeker, the data item may be a resume, while for an employer, the data item may be a position description. The client device may identify to the matching service any constraints on a match, such as geography or reputational considerations (Block 408). The client device may receive a report describing ranked target data item options (Block 410). The client device may present the report to the user (Block 412). The client device may receive at intervals a follow up report describing any new data items that have been added since the previous report (Block 414). The client device may present the follow up report to the user (Block 416).

Figure 5:
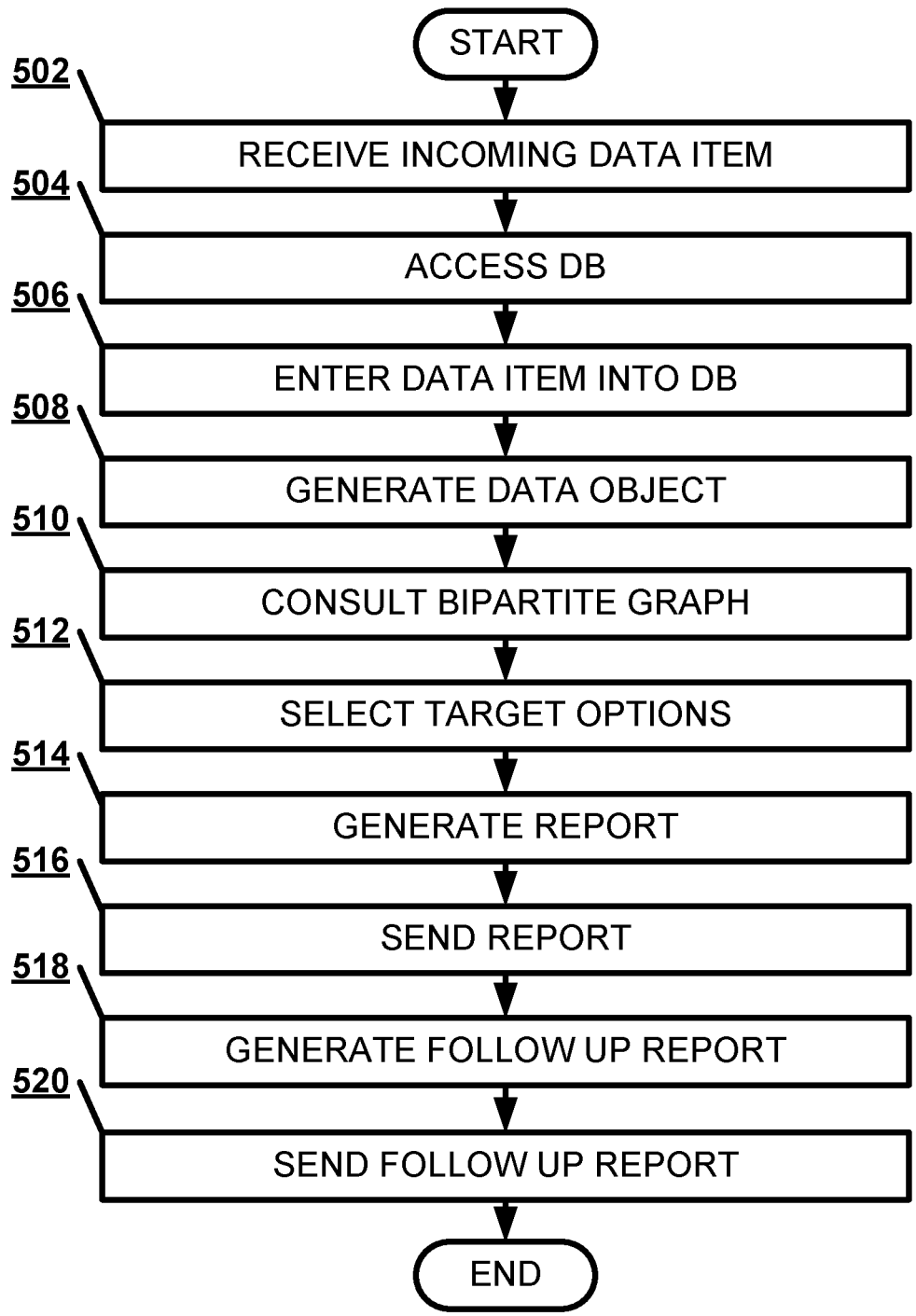
FIG. 5 illustrates, in a flowchart, one embodiment of a method of receiving a data item.

FIG. 5 illustrates, in a flowchart, one embodiment of a method 500 of receiving a data item in a matching service. A user input may receive an incoming data item from a client device describing aspects of a client user for matching purposes (Block 502). A graph manager may access a database storing an incoming data item set, a target incoming set, or a bipartite graph describing connections between the two (Block 504). The graph manager may enter the incoming data item into the database storing the incoming data item set (Block 506). The graph manager may generate an incoming data object to represent the incoming data item as a member of an incoming data object set representing the incoming data item set (Block 508).

An edge reader may consult the bipartite graph to calculate at least one individual qualification level estimate between the incoming data object and at least one target data object of the target data object set based on the bipartite graph (Block 510). The edge reader may select one or more target data item options based on the bipartite graph (Block 512). A report generator may generate a report ranking target data item options based on the at least one individual qualification estimate (Block 514). A client output may send the report to the client device (Block 516). If the client has requested follow up reports, the report generator may generate a follow up report ranking new target data item options based on newly calculated individual qualification estimates (Block 518). The follow up report may be triggered at intervals, upon the addition of a new target data item, or upon the creation of new cluster for either the incoming data items or the target data items. The client output may send the follow up report to the client device (Block 520).

Bipartite Graph

Figure 6:
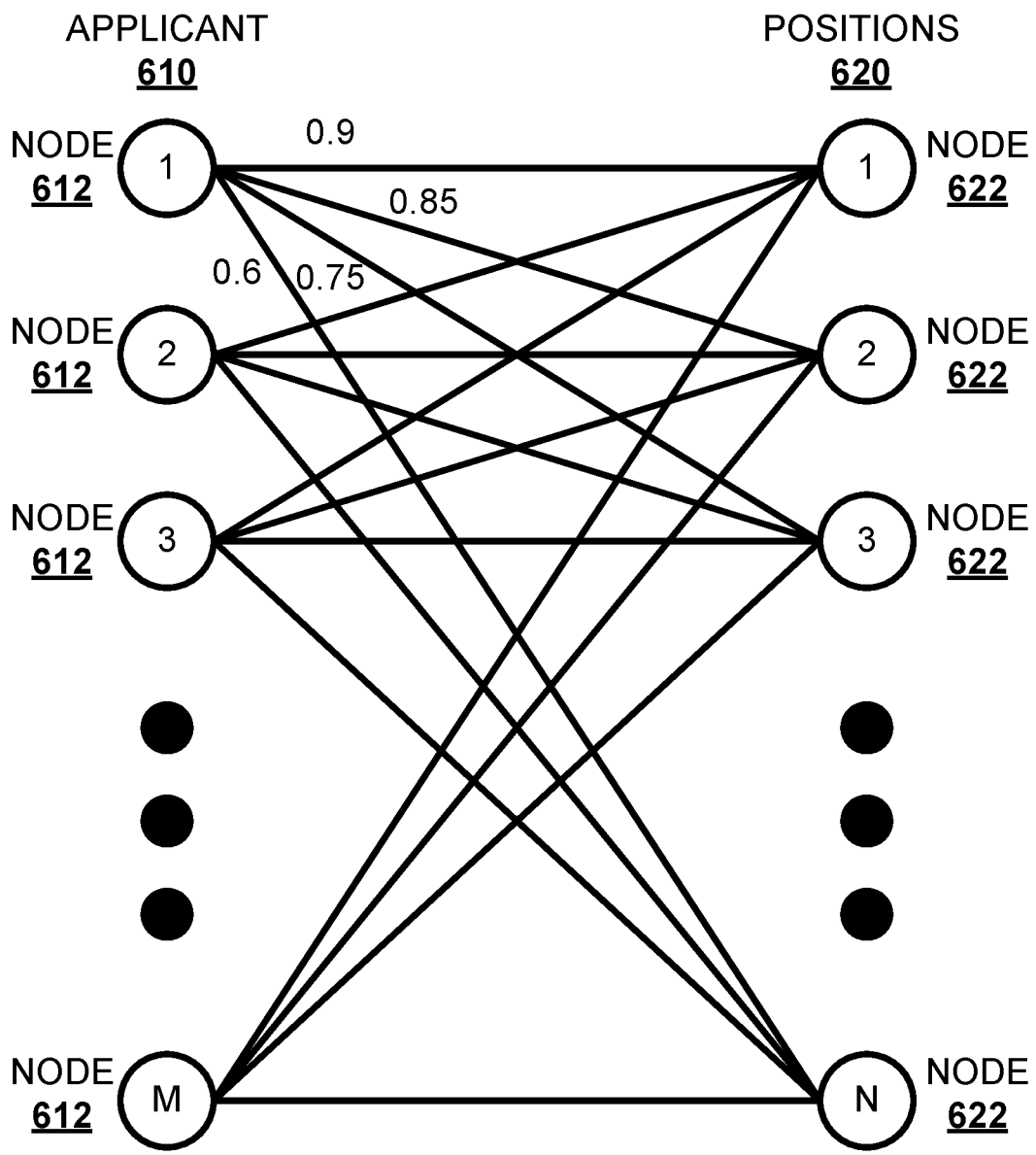
FIG. 6 illustrates, in a block diagram, one embodiment of a bipartite graph.

FIG. 6 illustrates, in a block diagram, one embodiment of a bipartite graph 600. The bipartite graph 600 may connect a first set 610 of data items and a second set 620 of data items. By connecting the two sets of data items, a user represented by the first set 610 may identify a group of options to match with from the second set 620. Similarly, a user represented by the second set 620 may identify a group of options to match with from the first set 610.

For example, the first set 610 of data items may represent the resumes of applicants looking for employment. The second set 620 of data items may represent opening descriptions from employers. A bipartite graph 600 may connect the resumes to the opening descriptions. An applicant can use the bipartite graph 600 to identify a set of employers with openings that match. Similarly, an employer can use the bipartite graph 600 to identify a set of qualified applicants.

The bipartite graph may group the data items within a data set into clusters. Each cluster may represent a species or type of data item to allow the data item to be matched to a target cluster of data items on a group basis, thus reducing the overhead required for the matching process. The first set 610 may represent each cluster of data items with a node 612. Similarly, the second set 620 may represent each cluster of data items with a node 622. Each node 612 of the first set 610 may be connected to each node 622 of the second set 620 by an edge. Each edge may be assigned a weight describing the probability that a data item of the node 612 from the first set 610 provides a good match to a data item of a node 622 from the second set 620. The probability may be based on the cluster qualification level estimate. To construct the bipartite graph, the graph manager may represent each data item with a data object that distills the qualities of the data item into those aspects that facilitate determining a match.

Figure 7:
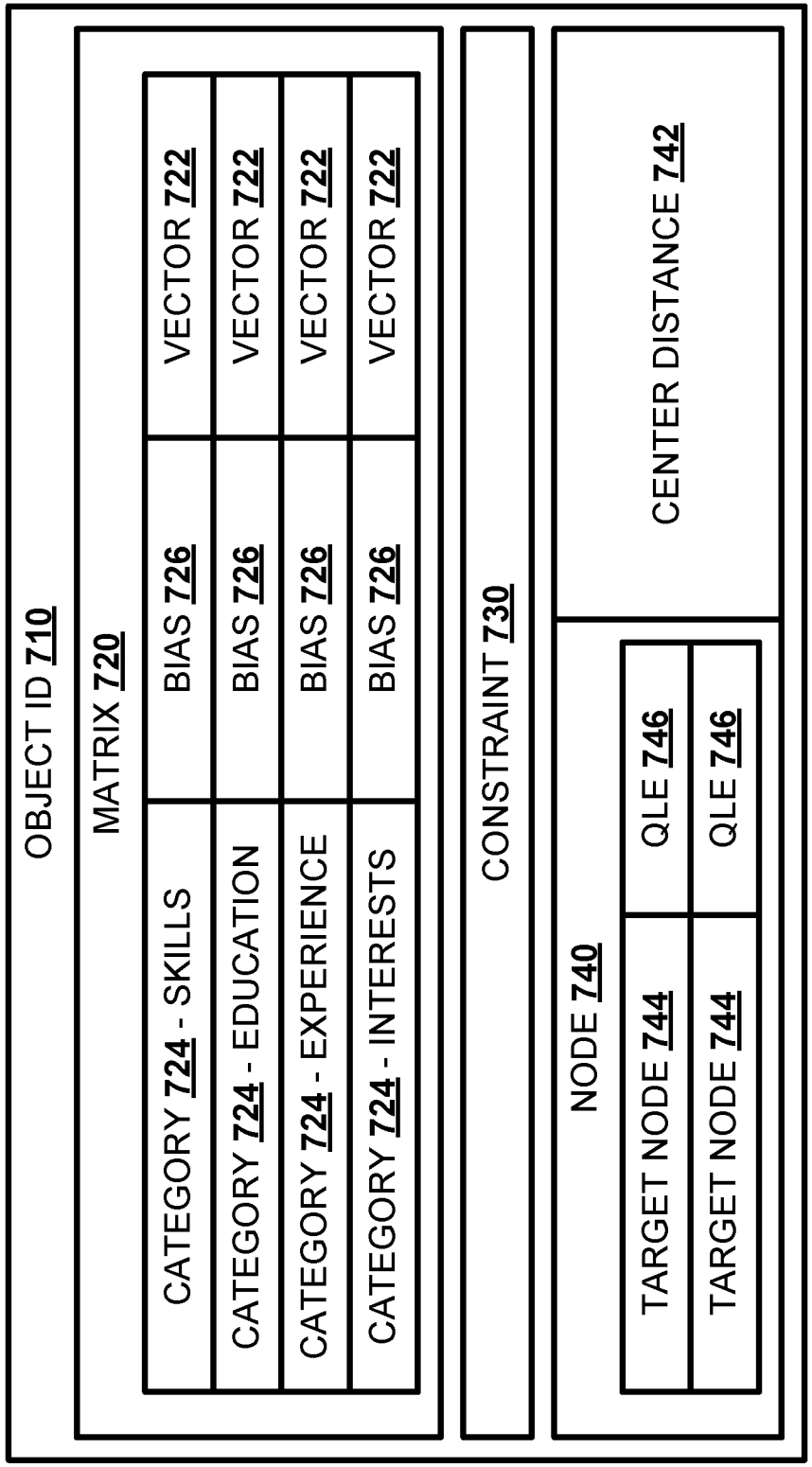
FIG. 7 illustrates, in a block diagram, one embodiment of a data object representing the data item.

FIG. 7 illustrates, in a block diagram, one embodiment of a representative data object 700 to represent the data item. The data object 700 may have an object identifier 710 associating the data object 700 with the data item the data object 700 is describing. The data object 700 may have a matrix 720 collecting one or more vectors 722 describing an attribute of the data item. Each vector 722 may be assigned a different category 724 indicating the type of attribute described by that vector 722. For example, if the data item is a job opening description or a resume, the categories 724 may be skill set, education, work experience, or interests. Each category 724 may have an assigned bias 726 indicating a value to apply to the category when calculating the probability of a match. The data object 700 may have a constraint 730, acting as a hard limitation on a match. For example, the vector 700 may have the constraint 730 of a geographic constraint 730, limiting matches to other data items in a limited location.

The graph manager may update the data object 700 to include any node 740 of the bipartite graph associated with the data object 700. The node 740 may represent a cluster of data objects to which the data object 700 belongs. The data object 700 may associate a center distance 742 describing the distance between the data object 700 and the cluster center of the cluster of data objects represented by the node 740. In some instances, the data object 700 may associate the node 740 with one or more target nodes 744 representing clusters of target data objects, along with a cluster qualification level estimate 746 describing the probability of a match between the data object and a target data object in the target cluster.

Figure 8:
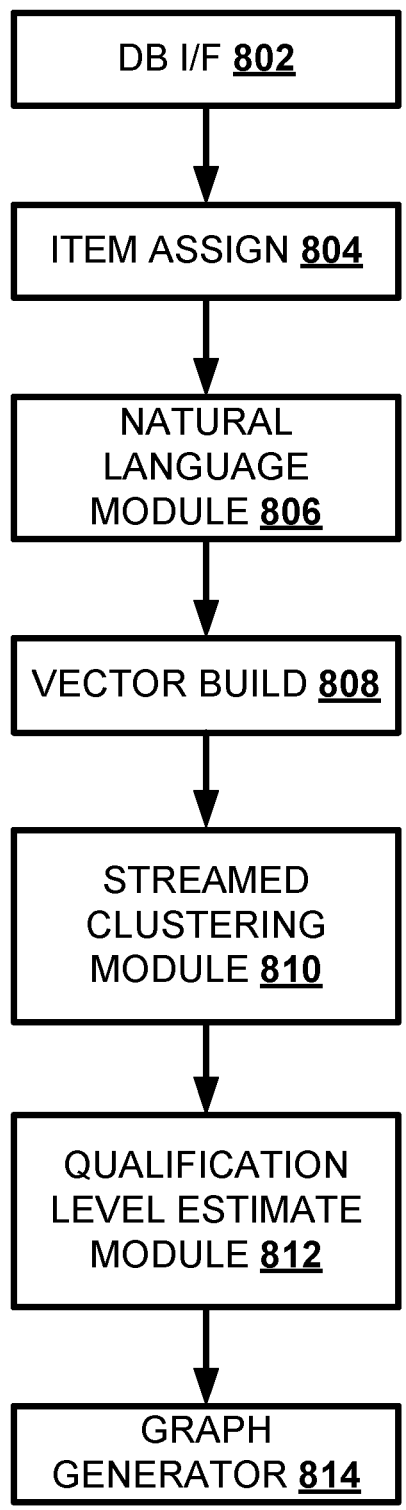
FIG. 8 illustrates, in a block diagram, one embodiment of a graph manager.

FIG. 8 illustrates, in a block diagram, one embodiment of a graph manager 800. A database interface 802 may access a database storing an incoming data item set or a target data item set. Additionally, the database may store an incoming data object set representing the incoming data item set, a target data object set representing the target set of data items, or a bipartite graph connecting the two. An item assignment module 804 may assign an incoming data item from the data client to the applicable set of data items. For example, for a job service, a resume for a job applicant may be assigned to a set of resumes while a job opening description from an employer may be assigned to a set of job opening descriptions. Alternately, for a dating service, a dating profile for a man, a woman, or a non-binary individual may be assigned to the appropriate set of dating profiles.

A natural language module 806 may process the document to translate attributes in the document for construction of a representative vector. A vector build module 808 may create an incoming vector to represent a quality described in the incoming data item in a quantifiable way. The vector build module 808 may produce an incoming vector for multiple categories. For a job service, the categories for the incoming vectors may be work experience, skill set, education, and interests. The vector build module 808 may give each category a different bias to cause those categories to have a greater effect on the outcome. The vector build module 808 may collect the multiple vectors into an incoming data object to represent the incoming data item.

A streamed clustering module 810 can identify clusters of data objects representing underlying species of data items, allowing the data items from both sets of data items to be internally grouped with data items having similar attributes to facilitate matching. Thus, the streamed clustering module 810 may group the incoming data item set into incoming clusters and group the target data item set into target clusters. The incoming clusters may represent an incoming species and the target clusters may represent a target species. The streamed clustering module 810 may identify an incoming cluster center for the incoming cluster. The streamed clustering module 810 may compare the incoming data object representing the incoming data item to the incoming cluster center. The streamed clustering module 810 may assign the incoming data object to the incoming cluster based upon an incoming center distance between the incoming data object and the incoming cluster center. Thus, the streamed clustering module 810 may assign the incoming data item to the incoming cluster based upon an incoming center distance between the incoming data item and the incoming cluster center.

A qualification level estimate module 812 may generate a qualification level estimate describing the probability of a match between an incoming data item and a target data item. The qualification level estimate 812 may generate a cluster qualification level estimate between an incoming cluster of an incoming data object set and a target cluster of a target data object set. The qualification level estimate module 812 may generate the cluster qualification level estimate between an incoming cluster center of the incoming cluster and a target cluster center of the target cluster. The cluster qualification level estimate may change over time as the cluster center moves due to the addition or removal of data items to the cluster. The qualification level estimate module 812 may generate an individual qualification level estimate between the incoming data object and a target data object in the target cluster. To calculate the individual qualification level estimate, the qualification level estimate module 812 may multiply a cluster qualification level estimate by a target center distance between the target data object and the target cluster center. A graph generator 814 may build a bipartite graph between the incoming clusters of the incoming data object set and the target clusters of the target data object set based on the cluster qualification level estimates.

Figure 9:
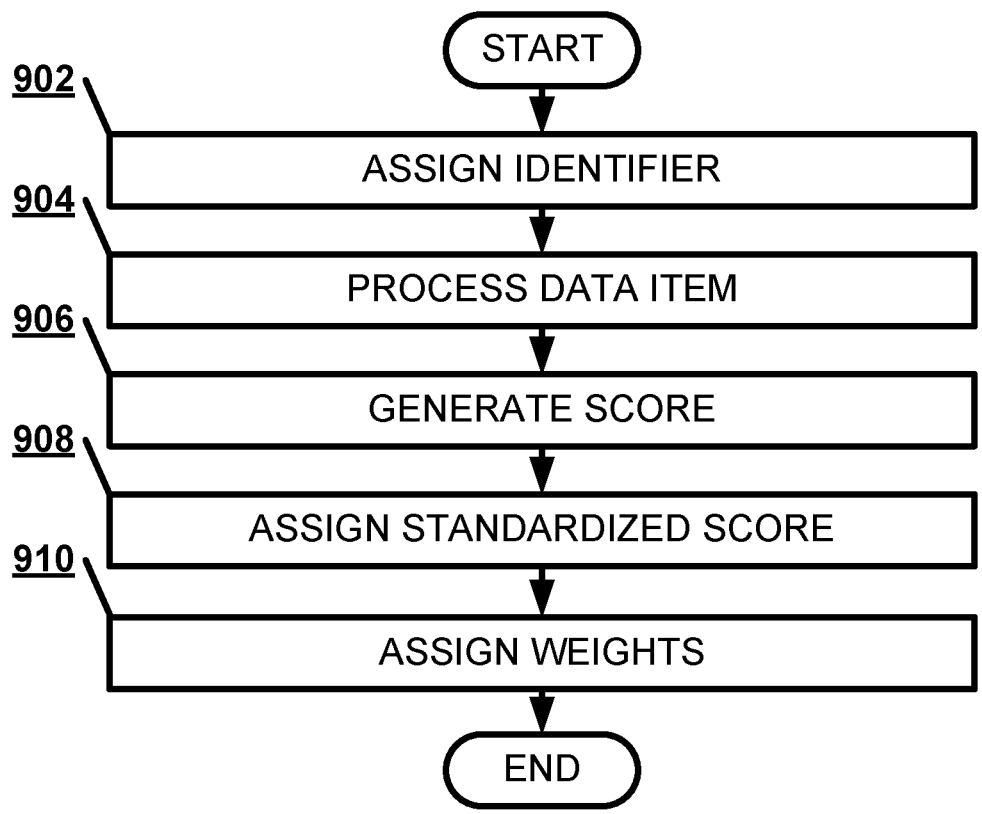
FIG. 9 illustrates, in a flowchart, one embodiment of a method of building a data object.

FIG. 9 illustrates, in a flowchart, one embodiment of a method of building a representative data object. An item assignment module may assign an object identifier to an incoming data item to connect the incoming data item to the representative data object (Block 902). A natural language module may use a topics database to process the incoming data item to translate attributes in the document for construction of a representative vector. (Block 904). A vector build module may generate a vector score based upon the incoming data item for each category of vector (Block 906). The vector build module may assign a standardized score as the category score for the incoming vector (Block 908). The vector module may assign a category bias for each category of vector (Block 910).

Figure 10:
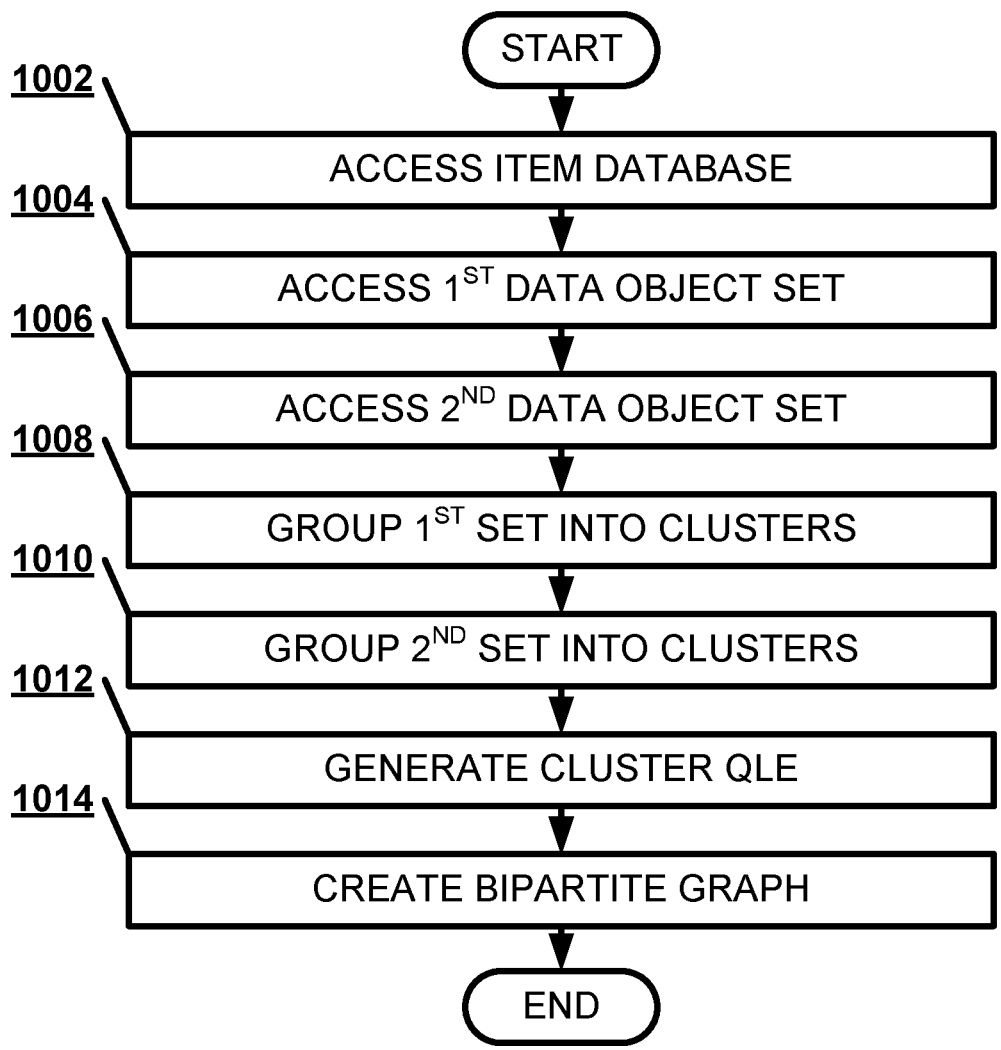
FIG. 10 illustrates, in a flowchart, one embodiment of a method of creating a bipartite graph.

FIG. 10 illustrates, in a flowchart, one embodiment of a method 1000 of creating a bipartite graph with a graph manager. A database interface may access a data item database to extract data items to generate a bipartite graph (Block 1002). The database interface may access a first data object set representing a first set of data items (Block 1004). For example, in a job service, the first set of data items may be a set of resumes for applicants. The database interface may access a second data object set representing a second set of data items (Block 1006). For example, in a job service, the second set of data items may be a set of job opening descriptions supplied by employers.

A streamed clustering module may group the first data object set into a first set of clusters representing species of data objects (Block 1008). The streamed clustering module may group the second data object set into a second set of clusters representing species of data objects (Block 1010). A qualification level estimate module may generate a cluster qualification level estimate between the cluster center of each cluster in the first set of clusters and the cluster center of each cluster in the second set of clusters (Block 1012). The graph generator may build a bipartite graph between the first data object set and the second incoming data object set by linking the first set of clusters and the second set of clusters based on the cluster qualification level estimates (Block 1014).

Figure 11:
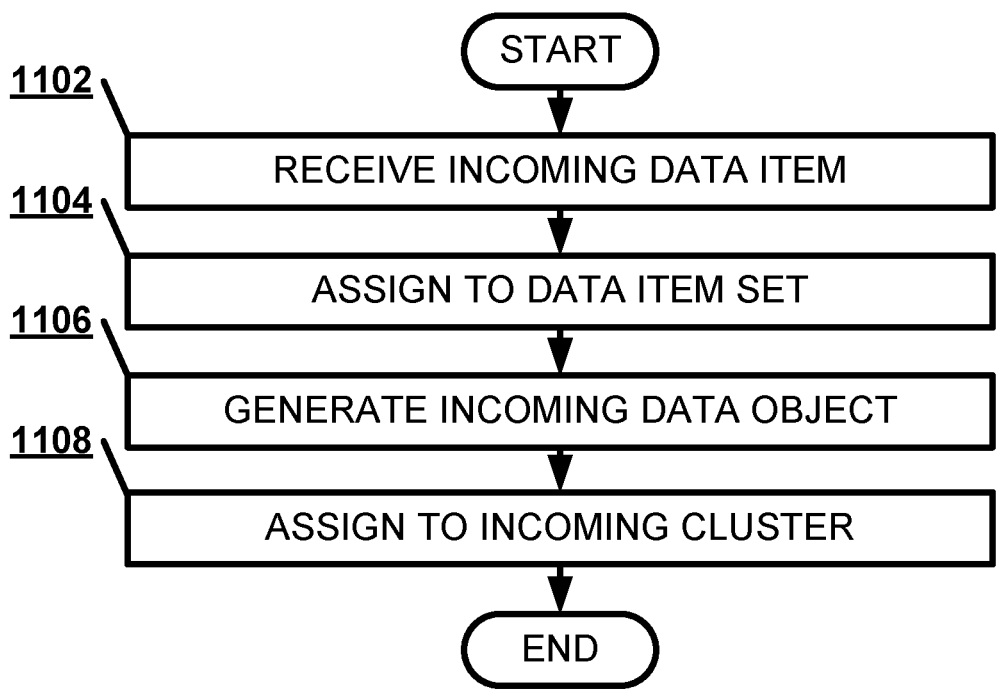
FIG. 11 illustrates, in a flowchart, one embodiment of a method of adding an incoming data item to the bipartite graph.

FIG. 11 illustrates, in a flowchart, one embodiment of a method 1100 of adding an incoming data item to the bipartite graph. A client input may receive an incoming data item from a client device describing aspects of a client user for matching purposes (Block 1102). An item assignment module may assign the incoming data item to the proper set of data items, referred to as the incoming data item set (Block 1104). A vector build module may use a natural language module to generate an incoming data object with one or more vectors representing one or more categories of attributes to represent the incoming data item among an incoming data object set representing an incoming data item set item (Block 1106). A streamed clustering module may assign the incoming data object to an incoming cluster based upon a distance between the incoming data object and the incoming cluster center (Block 1108).

Ecological Evolutionary Streamed Clustering

In order to effectively sort data, present information, and filter items based on qualification level estimates, previous iterations of search engines may store predetermined and stored qualification level estimates between users and positions. Traditional sorting and filtering methods may rely on user provided metrics or nonvolatile metrics. Most applications rely on aggregated ratings provided by users or, with Google®, the number of references to the specified page throughout the web. However, such a direct approach, as pertaining to qualification levels, may not be as efficient when attempting to match multiple large sets of data, as evidenced by the current lack of such methods available.

In the labor market, the primary barriers to such a solution can be the variability of data in the labor economy, the rate at which job creation occurs, and the sheer size of the resulting bipartite graph. According to the Bureau of Labor Statistics, more than 2 million jobs were added to the US economy in 2017 alone, this results in a daily job creation rate that is equivalent to about 5,500 jobs posted each day. Each job posting has an estimated life span of 51 days resulting in a daily position population of approximately 279,452 job openings. In addition, with over 96 million Americans currently seeking employment, a complete daily bipartite graph to accommodate these two groups would result in over $2.683 \times 10^{13}$ connections. If a search engine used a traditional brute force method to determine the qualification level estimate for each connection, the search engine would need to calculate over 300 million scores per second to finish in a year. To make matters worse, any position or user that is changed or created would require that the mechanism redetermine the qualification level estimates of that node, adding to the already substantial computation burden. More abstractly, the optimal time to construct such a bipartite graph may be represented by the function O(NM), where N represents the total number of users and M represents the total number of positions. Subsequent update time may have a complexity of O(N) or O(M) depending on which node is updated. To address this issue, a streamed clustering module allows for the clustering of user and position streamed data which reduces the cost of graph construction to O(nm). In this equation, the variable n may represent the cardinality of the sets of users and the variable m may represent position clusters. Ideally, n is a smaller subset of N and m is a smaller subset of M.

To cluster streamed elements without prior knowledge as to the number of clusters to fill, a streamed clustering module may use a heuristic mechanism inspired by ecological observations on species population growth and development. The heuristic mechanism assumes latent, ideally Gaussian, distributions that represent the "true" clusters from which the data is drawn. Each distribution may represent the density of necessary resources for a species to grow. Intuitively, the introduction of a data point may represent the presence of an unidentified organism. The streamed clustering module may attempt to determine the success of this organism, as well as its species, without immediate knowledge as to the density of resources consumed. When the density of resources is high, such as when the underlying probability density function is dense in the region, further similar data points may appear, allowing for the organism's species to grow. Similarly, high resource availability allows for more rapid species reproduction. Conversely, if resources are sparse, fewer similar organisms may appear. The probability that the organism will be reclassified or subsumed by another species increases as time progresses. Thus, the location of a new data point may either create a new species or subspecies or be subsumed by more successful neighbors. When the classification of a new point is split between several clusters, the merging of those species, depending on species population and the similarity of the cluster centers to the unclassified data point, becomes a possibility. Such an occurrence can be interpreted as two or more species sharing qualities with a new unclassified entity thereby increasing the probability that said species are related. When an organism is assigned to a species but is sufficiently different, then a subspecies is created. This process may allow for the natural evolution of clusters without human oversight.

The streamed clustering module may compare a new data point to all previous cluster centers using a custom distance metric which determines the proportion of elements that differ between the two vectors. The streamed clustering module may execute the function, denoted as $d(\vec{x}, \vec{y})$ or $d: \mathbb{R}^n \times \mathbb{R}^n \rightarrow [0,1]$ and defined as:

$$d(\vec{x}, \vec{y}) = \frac{sum(|\vec{x} - \vec{y}|)}{sum(vmax(\vec{x}, \vec{y}))}$$

The function $vmax(\vec{x}, \vec{y})$ returns a vector with the maximum elements between both vectors in the corresponding indices.

$$vmax(\vec{x}, \vec{y}) = \forall x_i \in \vec{x} \text{ and } \forall y_i \in \vec{y} \begin{cases} x_i, \text{ if } x_i > y_i \\ y_i, \text{ otherwise} \end{cases}$$

The raw distance value, normalized to be a number in the interval [0; 1], may act as the inverse probability of the data point being a member of said cluster. In this way, each feature vector may be considered the genome of a species or organism. Thus, the more similar the genomes, the more likely the two elements are related. For larger clusters, the algorithm may also assess the data point's average distance to a randomly generated set of cluster elements. The streamed cluster module may use this set of randomly selected cluster elements to calculate a sampled mean distance between the unidentified data point and the cluster being assessed. If the data point in question is allocated to any given cluster, then the probability of forming a subspecies can be given by a subspecies probability function $P_s(x|g)$. The subspecies probability function $P_s(x|g)$ is the probability that data point x forms a subspecies s of given cluster g. In the subspecies probability function, the variable x is the data point in question, the variable c is the cluster center distance, the variable m is the sample mean distance, α is a tuning variable, and g∈G is the cluster.

$$P_s(x|g) = \alpha \frac{|c - m|}{1 + (c + cm)}$$

The subspecies probability function may increase the probability of creating a subspecies cluster when the difference between the cluster center difference and the cluster sample mean difference grows. When a cluster forms a new subspecies cluster, overriding the previous cluster assignment, the streamed clustering module can consolidate all closely matched data points that were sampled to that new subspecies cluster. Such functionality may also double as a means of undoing cluster merges. In the case of cluster assignment collision, assuming the data point is not designated as the cluster center of a subspecies, the streamed clustering module can calculate the likelihood of the clusters merging as the product of all related cluster assignment probabilities as well as the difference between said probabilities. The unclassified data point may become the new cluster center.

The streamed clustering module may temper the tendency to merge by using another tuning variable affected by each cluster's current population. The population based merging function $P_m(\vec{g_1}, \vec{g_2}|p_1, p_2, \vec{x})$ may represent the probability of merging clusters with centers $\vec{g_1}$ and $\vec{g_1}$ given their respective population sizes $p_1$ and $p_2$, a sigmoid function $\sigma: \mathbb{R} \rightarrow (0; 1)$, and the new data point x. The sigmoid function may act as a second tuning variable to prevent undue merges.

$$P_m(\vec{g_1}, \vec{g_2}|p_1, p_2, \vec{x}) = \sigma(p_1)(1 - d(\vec{g_1}, \vec{x}))\sigma(p_2)(1 - d(|d(\vec{g_2}, \vec{x}) - d(\vec{g_1}, \vec{x})|))$$

If the population of the cluster is too small based on an adjustable value, then the sigmoid value will trend towards zero making the probability of a merge small. If the cluster population is large, the sigmoid value operates in the opposite direction. The sigmoid function may prevent smaller, nascent, clusters from being consumed too quickly. An alternative method of handling cluster merging is to have the probability of a merge occurring between two clusters be proportional to the ratio of contentious points recorded between the two clusters in question and the combined population of both clusters. With this approach, the larger, more established, clusters can require more contentious points to be present before a merger becomes likely, while the smaller clusters are more easily unified. Regardless of the cluster merging mechanism, if no merges occur, the streamed clustering module assigns the data point to the cluster with the lowest distance value. If the data point in question is a designated subspecies center, however, then the streamed clustering module may merge all other subspecies generated by this data point into one. If no assignment is made, the streamed clustering module may create a new cluster based on that new data point.

The stochastic nature of cluster assignments naturally caps the number of clusters generated as the probability the streamed clustering module not assigning a new data point trends towards zero as more clusters are created. In addition, while the streamed clustering module may overestimate the number of clusters, the accuracy of the resulting clusters may be sufficient for the task assigned.

Figure 12:
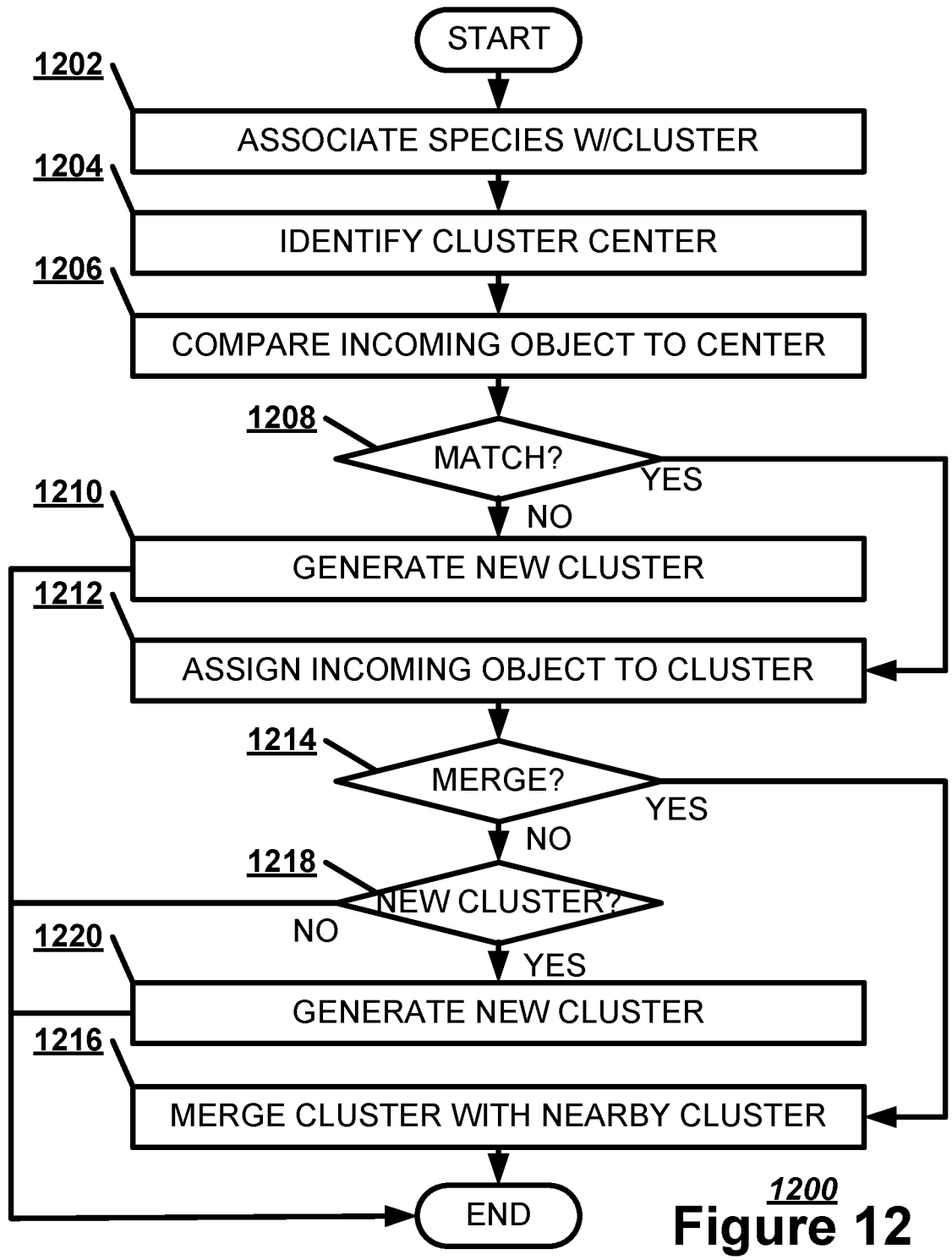
FIG. 12 illustrates, in a flowchart, one embodiment of a method of reducing a dimensionality of a data set.

FIG. 12 illustrates, in a flowchart, one embodiment of a method of adding a data object to a data cluster. A streamed clustering module may associate an incoming species with an incoming cluster of an incoming data object set (Block 1202). The streamed clustering module may identify an incoming cluster center for the incoming cluster (Block 1204). The streamed clustering module may compare an incoming data object representing an incoming data item to an incoming cluster center for an incoming cluster representing an incoming species of the incoming data object set (Block 1206).

If the incoming data object is unassigned to an existing incoming cluster (Block 1208), the streamed clustering module may generate a new incoming cluster for the incoming data object (Block 1210). Otherwise, the streamed clustering module may assign the incoming data object to the incoming cluster based upon an incoming center distance between the incoming data object and the incoming cluster center (Block 1212). If the streamed clustering module determines the incoming cluster is to be merged with a nearby incoming cluster (Block 1214), the streamed clustering module may merge the incoming cluster with a nearby incoming cluster (Block 1216). If the streamed clustering module determines the incoming data object belongs to a new incoming cluster generated from the incoming cluster (Block 1218), the streamed clustering module may generate the new incoming cluster within the original incoming cluster (Block 1220).

Figure 13:
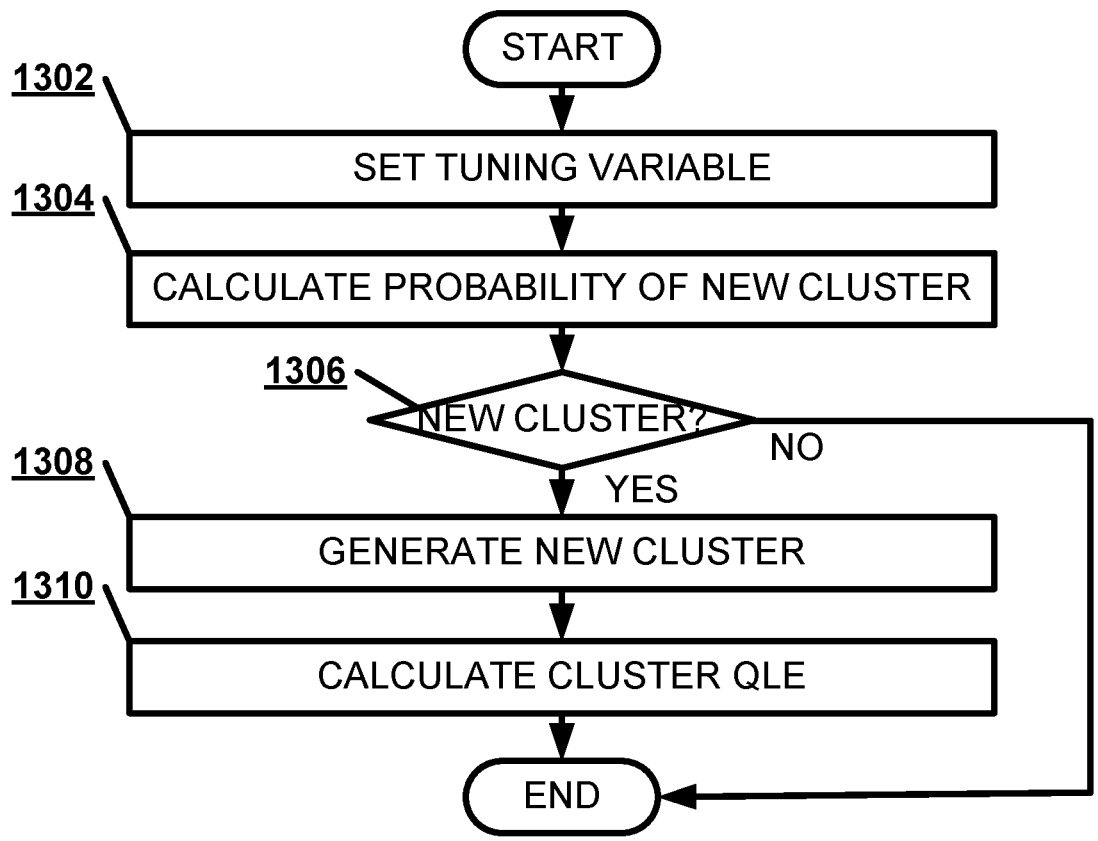
FIG. 13 illustrates, in a flowchart, one embodiment of a method of creating a new cluster from within an existing cluster.

FIG. 13 illustrates, in a flowchart, one embodiment of a method of creating a new cluster from within an existing cluster. A streamed clustering module may set a tuning variable to calculate whether to create a new incoming cluster generated from the incoming cluster (Block 1302). The streamed clustering module may calculate the probability that the incoming data object forms a new incoming cluster (Block 1304). If the streamed clustering module determines that the incoming data object is probably part of a new incoming cluster (Block 1306), the streamed clustering module may generate the new incoming cluster from within the existing incoming cluster to contain the incoming data object (Block 1308). A qualification level estimate module may then calculate the cluster qualification level estimates between the new incoming cluster and the target clusters (Block 1310).

Figure 14:
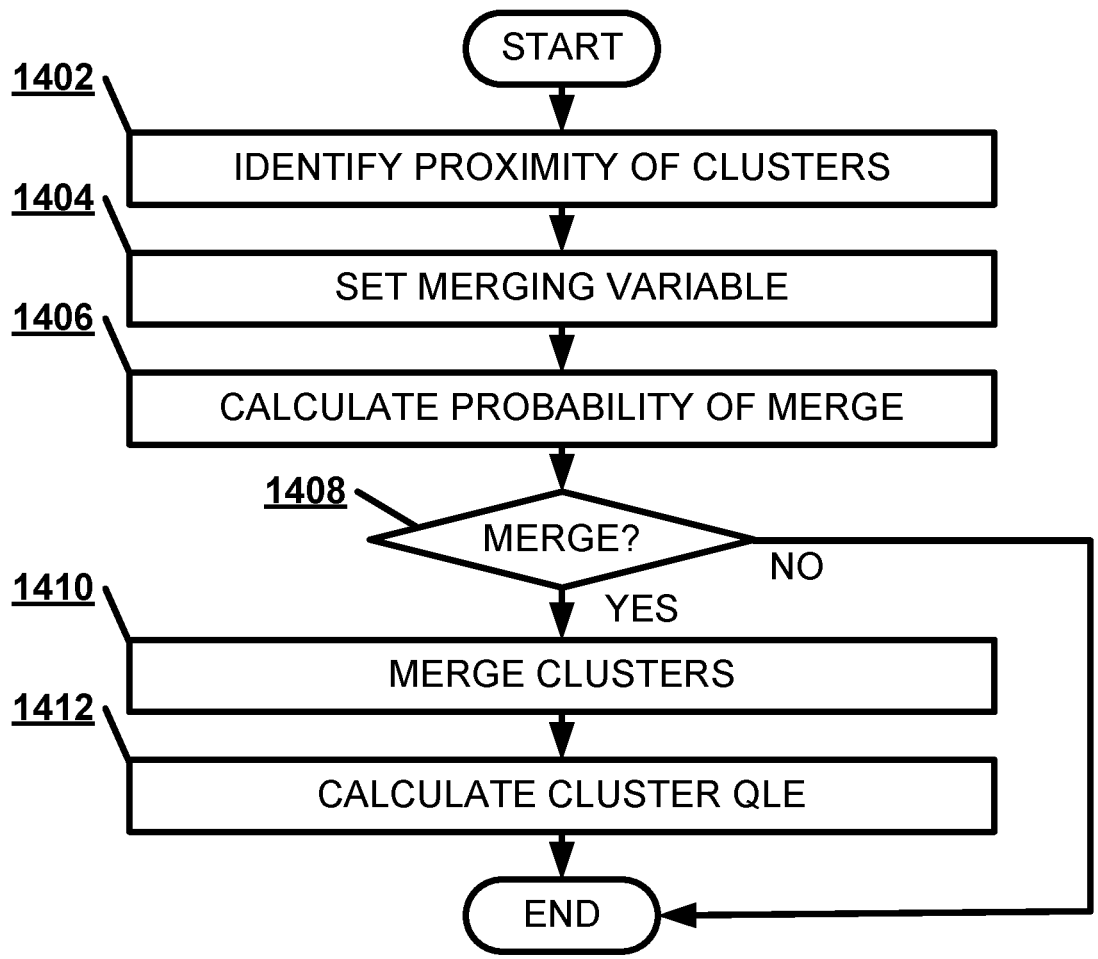
FIG. 14 illustrates, in a flowchart, one embodiment of a method of merging two clusters.

FIG. 14 illustrates, in a flowchart, one embodiment of a method of merging two clusters. A streamed clustering module may identify when an incoming data object is within a reasonable proximity of multiple incoming cluster centers (Block 1402). The streamed clustering module may set a merging variable to calculate whether to merge the incoming cluster with the nearby incoming cluster (Block 1404). The streamed clustering module may calculate the probability that incoming cluster is to merge with the nearby incoming cluster (Block 1406). If the streamed clustering module determines that the incoming cluster is to merge with the nearby incoming cluster (Block 1408), the streamed clustering module may merge the incoming cluster with a nearby incoming cluster (Block 1410). A qualification level estimate module may then calculate the cluster qualification level estimates between the new incoming cluster representing the merged incoming clusters and the target clusters (Block 1412).

Figure 15:
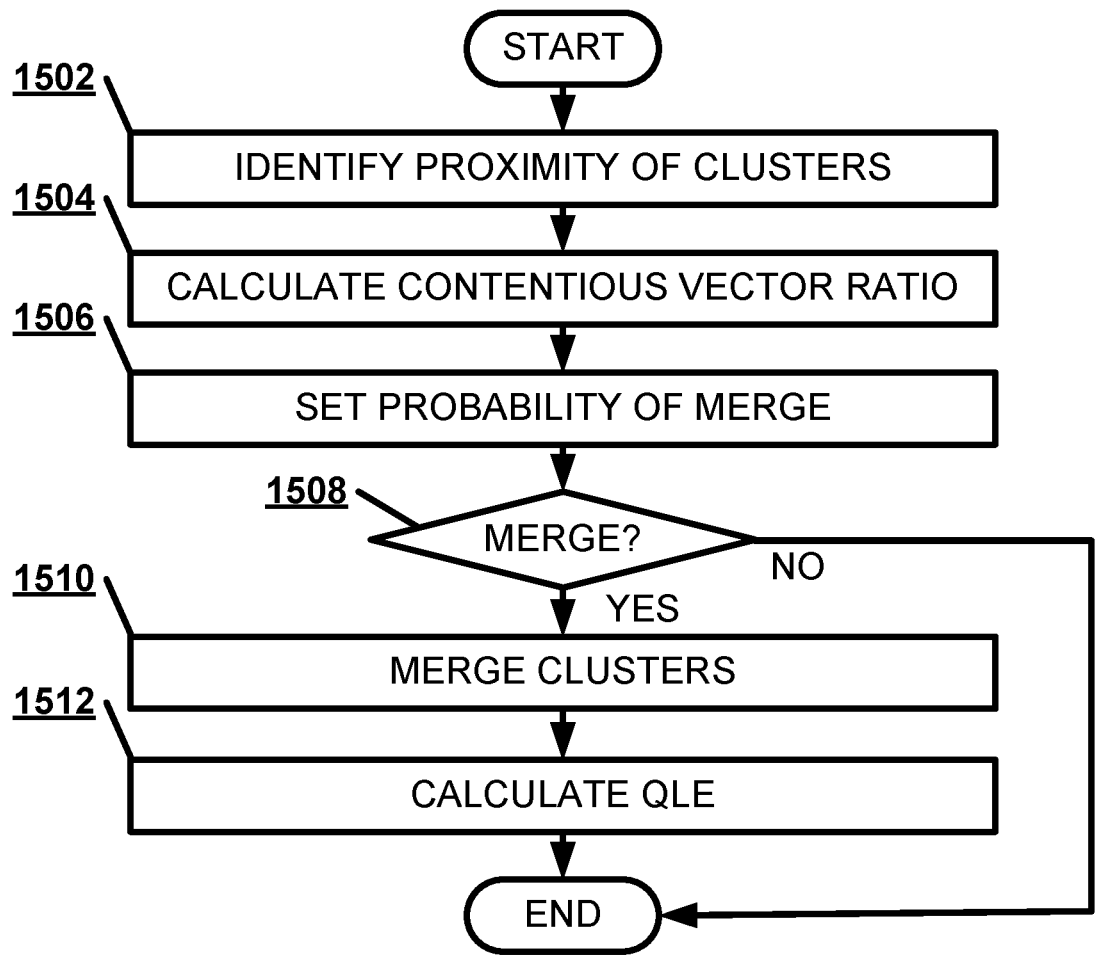
FIG. 15 illustrates, in a flowchart, one embodiment of an alternate method of merging two clusters.

FIG. 15 illustrates, in a flowchart, one embodiment of an alternate method of merging two clusters. A streamed clustering module may identify when an incoming data object is within a reasonable proximity of multiple incoming cluster centers (Block 1502). The streamed clustering module may calculate a ratio of contentious data objects between two incoming clusters to total incoming data objects of the two incoming clusters (Block 1504). The streamed clustering module may set a merger probability to equal the ratio (Block 1506). If the streamed clustering module determines that the incoming cluster is to merge with the nearby incoming cluster (Block 1508), the streamed clustering module may merge the incoming cluster with a nearby incoming cluster (Block 1510). A qualification level estimate module may then calculate the cluster qualification level estimates between the new incoming cluster representing the merged incoming clusters and the target cluster (Block 1512).

Qualification Level Estimate

The qualification level estimate (QLE) module may assess the compatibility between a data item from a first set of data and a data item from a second set of data by determining the similarity of each item's representative data object. The data item may be represented by multiple data objects representing a specific aspect of the data item. For example, for a job service, the data item may be represented by vectors describing skills, education, work experience, and interests. This approach may reduce screening costs for both applicants and employers as well as provides incentives for user resumes to be as comprehensive as possible. To allow for partial matches, the qualification level estimate module may make use of standard natural language processing techniques to identify the category or topic of a vector. As an example, if a person works in the electrical engineering industry, the qualification level estimate module may use natural language processing to identify that person as having engineering experience. With this information stored, if a position is looking for someone with similar industry exposure, such as software engineering, the qualification level estimate module may assign partial work experience points to the previously mentioned user. The qualification level estimate module may use a Latent Dirichlet Allocation or Gibbs sampling topic modeler that was trained on a manually prepared "gold standard" word or topic association data set, with words-to-topics being a one-to-many association. For example, the word "mathematics" may be associated with "engineering" or "mathematics". In situations having a standardized selection of industry and major items from which a user can choose, traditional natural language pre-processing of a text may be unnecessary. Instead, to categorize the set of elements and store their resulting topic associations, a natural language processing module may form each standardized industry and major item into an independent document with words parsed from a myriad of online sources describing each element. The natural language processing module may sort each "document" by the topic modeler into their respective categories. The graph manager may store this information in a topic database to ensure that the data is easy to access for qualification level estimate purposes. By storing all topic matches, this process greatly reduces, if not eliminates, the computational costs associated with natural language pre-processing, increasing speed and reducing cost.

The qualification level estimate module may divide the actual scoring process into four separate calculations. The qualification level estimate module may conduct each calculation in the same fashion, while applying different biases to the results of these calculations. Under the job board example, skills, work experience, and education may all retain relatively high biases while applicant's interests may have a relatively minor bias. These biases are reflective of the generally assigned importance for each aspect of an applicant's resume. If a target data item has no requirements posted for a specific category, then the bias for that category may be redistributed evenly across each remaining element. This process allows the user to fundamentally determine the importance of a category to their decision-making process. The qualification level estimate module may produce a final score that is the biased sum of all four separately calculated scores.

The qualification level estimate module may concatenate a vector with all related category vectors. The qualification level estimate module may then execute an operation to determine vector similarity. For example, when trying to match an applicant to an open position, the qualification level estimate module may determine a vector similarity between an applicant vector $\vec{a}$ and a position vector $\vec{p}$, as normalized from [0,1]. The qualification level estimate module may execute the operation:

$$s(\vec{a}, \vec{p}) = 1 - \frac{sum(\vec{p} - fparse(\vec{a}, \vec{p}))}{sum(\vec{p})}$$

Where feature vector parser function fparse is represented by:

$$fparse(\vec{a}, \vec{p}) = \forall a_i \in \vec{a} \text{ and } \forall p_i \in \vec{p} \begin{cases} p_i, \text{ if } a_i > p_i \\ a_i, \text{ otherwise} \end{cases}$$

The variable i represents the matching indices for both vectors. This calculation can hold true for each user and position feature vector. The calculation is synonymous to determining the number of matching elements per feature vector. To account for major and industry categories, the qualification level estimate module may create category vectors in conjunction to the major and industry vectors. As an example, position 1 may require work experience involving industry 1 which matches to categories 1, 2, and 3 with biases 0.9, 0.6, and 0.7 respectively. The vectors may be 1 indexed. The vector build module may create the vectors for the position's industry categories and industries required. The vector $\vec{c}$ represents categories and vector $\vec{d}$ represents industries.

$$\vec{c} = \begin{bmatrix} 0.9 \\ 0.6 \\ 0.7 \\ \vdots \\ 0 \end{bmatrix}, \vec{d} = \begin{bmatrix} 1 \\ 0 \\ 0 \\ \vdots \\ 0 \end{bmatrix}, concat(\vec{c}, \vec{d}) = \begin{bmatrix} 0.9 \\ 0.6 \\ 0.7 \\ \vdots \\ 0 \\ 1 \\ 0 \\ 0 \\ \vdots \\ 0 \end{bmatrix},$$

The vector fed into the qualification level estimate module may be the concatenated vector, concat($\vec{c}, \vec{d}$).

Figure 16:
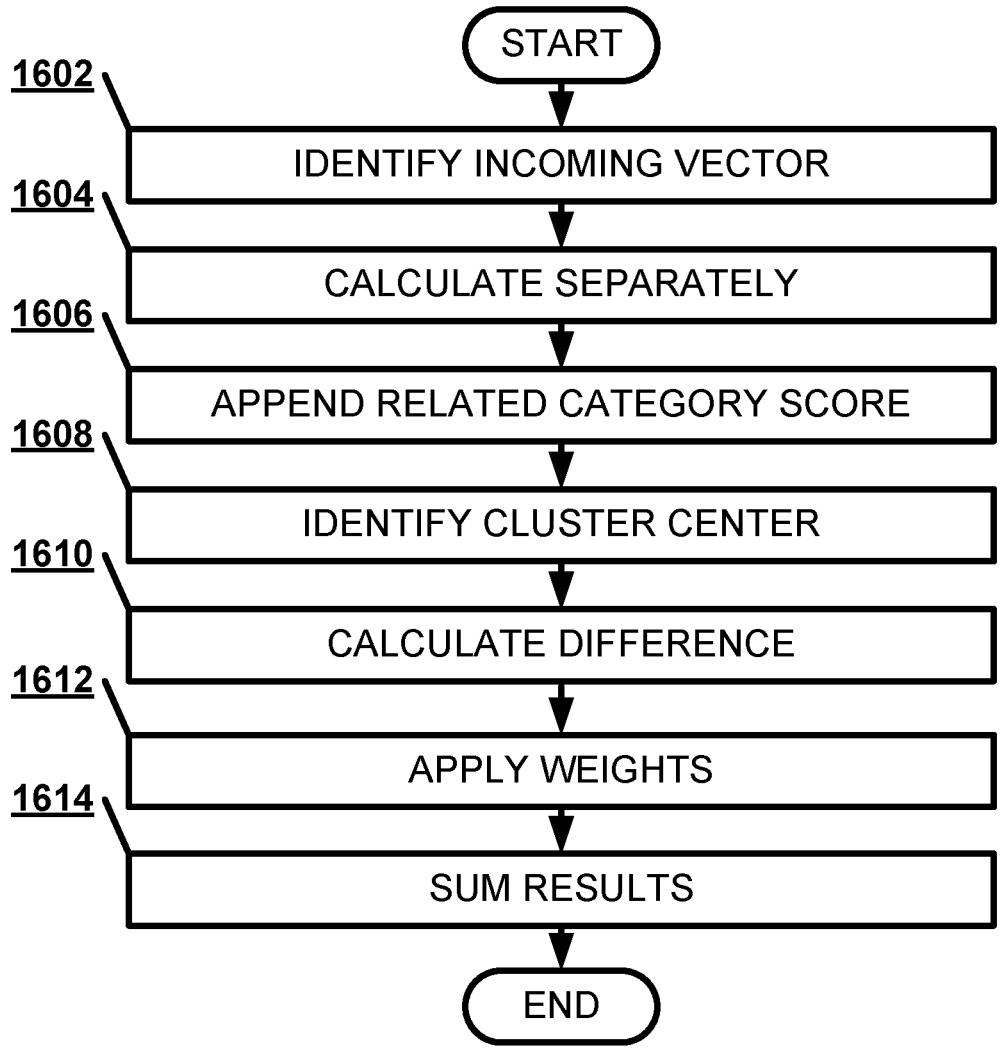
FIG. 16 illustrates, in a flowchart, one embodiment of a method of estimating a qualification level.

FIG. 16 illustrates, in a flowchart, one embodiment of a method of estimating a qualification level. A qualification level estimate module may identify each incoming vector of an incoming data object representing the incoming data item (Block 1602). The qualification level estimate module may calculate each incoming vector of the incoming data object in separate category calculations (Block 1604). The qualification level estimate module may append a related category score to the category score for the incoming vector (Block 1606). The qualification level estimate module may identify an incoming cluster center for an incoming cluster and a target cluster center of a target cluster (Block 1610). The qualification level estimate module may calculate a difference between an incoming cluster center of an incoming cluster and a target cluster center of a target cluster (Block 1610). The qualification level estimate module may apply the appropriate bias based on category to the result (Block 1612). The qualification level estimate module may sum the result for each vector calculation to determine a final score for the incoming data item (Block 1614).

Figure 17:
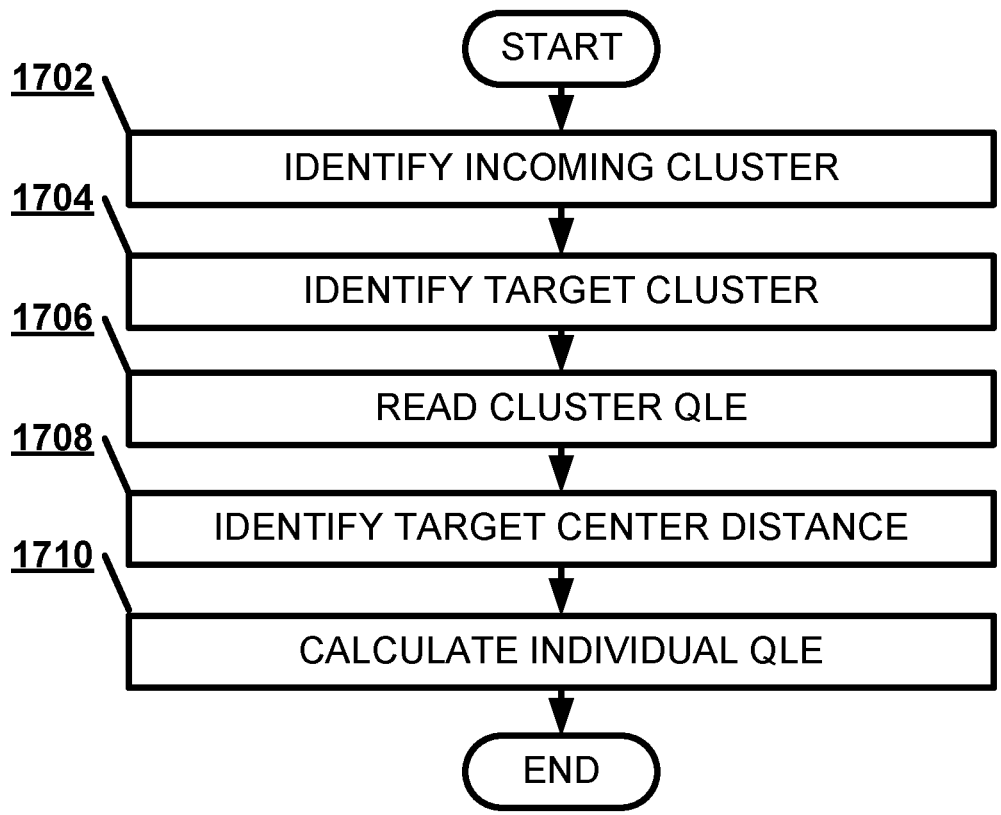
FIG. 17 illustrates, in a flowchart, one embodiment of a method of generating an individual qualification level estimate between an incoming data object and a target data object.

FIG. 17 illustrates, in a flowchart, one embodiment of a method of generating an individual qualification level estimate between an incoming data object and a target data object. An edge reader may identify an incoming cluster assigned to an incoming data object representing an incoming data item (Block 1702). An edge reader may identify a target cluster of a target object data set representing a target data item set (Block 1704). The edge reader may read a cluster qualification level estimate between an incoming cluster center of the incoming cluster and a target cluster center of the target cluster from the bipartite graph (Block 1706). Thus, the edge reader may read a cluster qualification level estimate for the target cluster in relation to the incoming data object. The edge reader may identify a target center distance between a target data object in the target cluster and the target cluster center (Block 1708). A qualification level estimate module may calculate an individual qualification level estimate between the incoming data object and a target data object based on the cluster qualification level estimate (Block 1710). The qualification level estimate module may multiply the cluster qualification level estimate by the target center distance for that target data object to calculate the individual qualification level estimate for that target data object.

Figure 18:
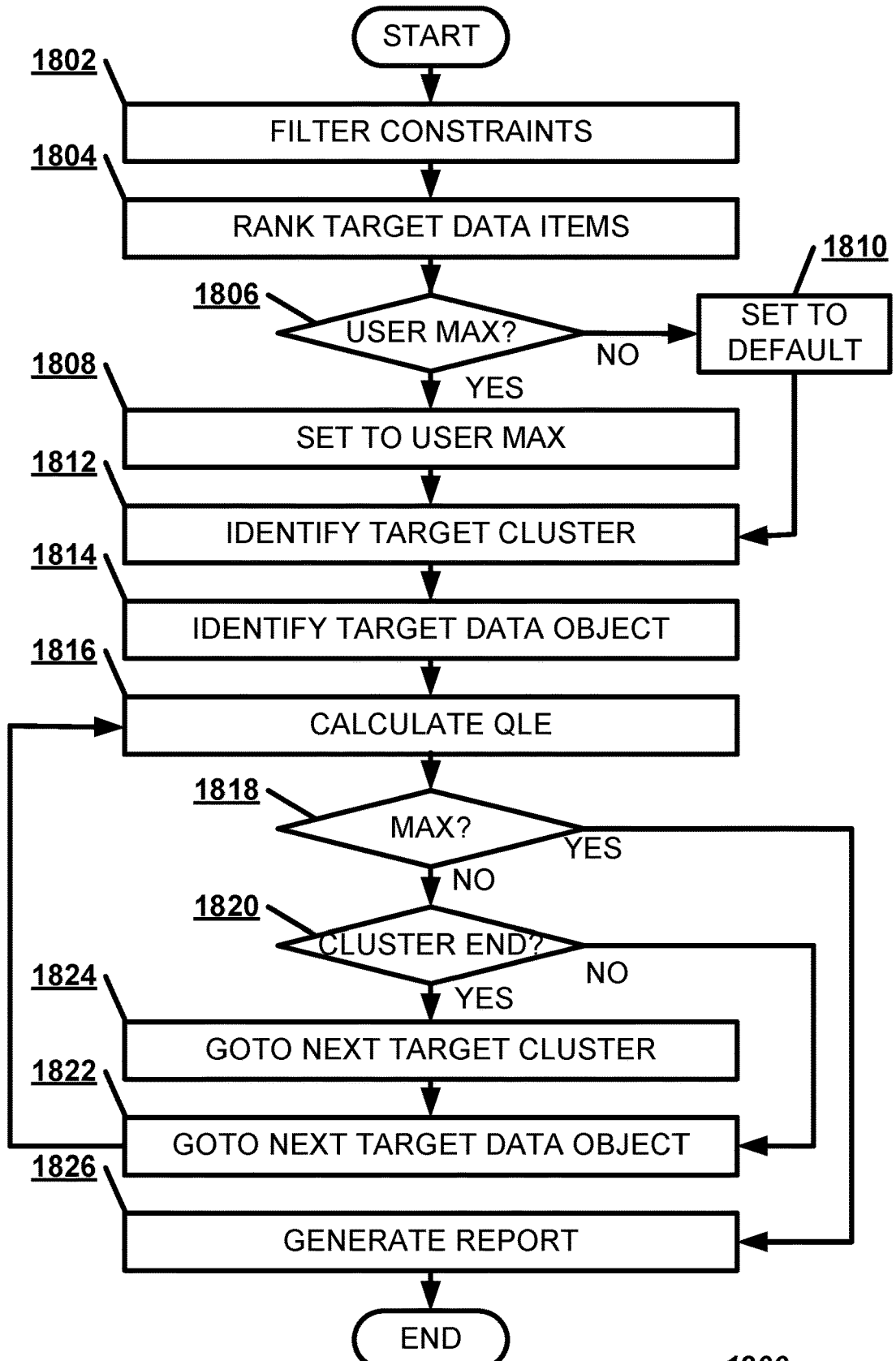
FIG. 18 illustrates, in a flowchart, one embodiment of a method of generating a report ranking target data item objects.

FIG. 18 illustrates, in a flowchart, one embodiment of a method of generating a report ranking target data item objects. The report generator may filter any target data items that do not meet the constraints of the incoming data item (Block 1802). For example, if a user has specified not being interested in any jobs outside the state of Kansas, the report generator may remove any positions available in Illinois. The report generator may rank the target data items based first on cluster qualification level estimate, then based on target center distance (Block 1804). If the user has provided a maximum number of target data item options to return (Block 1806), the report generator may set the return maximum to the user provided maximum number (Block 1808). Otherwise, the report generator may set the return maximum to a default number that is equal to or less than the total number of target data items (Block 1810).

A qualification level estimate module may identify the next target cluster to examine (Block 1812). The qualification level estimate module may identify the next target data object in the target cluster to examine (Block 1814). The qualification level estimate module may calculate the individual qualification level estimate for that target data object by multiplying the cluster qualification level estimate for the target cluster by the target center distance (Block 1816). If the report generator has not reached the return maximum (Block 1818), and the report generator has not calculated an individual qualification estimate for every target data object in the cluster (Block 1820), the report generator may go to the next available target data object (Block 1822). If the report generator has calculated an individual qualification estimate for every target data object in the cluster (Block 1820), the report generator may go to the next available target cluster (Block 1824). If the report generator has reached the return maximum (Block 1818), the report generator may generate a report ranking target data item options (Block 1822).

Thus, in one embodiment, a matching service that executes an optimized search engine to match two sets of data items. A client input of the optimized search engine may receive an incoming data item from a client device. The optimized search engine may represent the incoming data item with an incoming data object. A streamed clustering module may assign the incoming data object to an incoming cluster of an incoming data object set. An edge reader may consult a bipartite graph to determine a cluster qualification level estimate between the incoming cluster and a target cluster of target data objects. The edge reader may use the cluster qualification level estimate to calculate at least one individual qualification level estimate between the incoming data object and at least one target data object of the target cluster. A report generator may generate a report ranking target data item options based on the at least one individual qualification level estimate. A client output of the optimized search engine may send the report to the client device.

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Embodiments within the scope of the present invention may also include non-transitory computer-readable storage media for carrying or having computer-executable instructions or data structures stored thereon. Such non-transitory computer-readable storage media may be any available media that can be accessed by a general purpose or special purpose computer. By way of example, and not limitation, such non-transitory computer-readable storage media can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

I claim:

1. A non-transitory computer readable storage medium having an optimized search engine executed by a hardware processor reading a series of instructions from a hardware memory, comprising:
    a database interface configured to access an incoming data item set and a target data item set;
    a streamed clustering module configured to group the incoming data item set into incoming clusters and to group the target data item set into target clusters;
    a qualification level estimate module configured to generate a cluster qualification level estimate between an incoming cluster of the incoming clusters and a target cluster of the target clusters;
    a graph generator configured to build a bipartite graph between the incoming clusters and the target clusters based on the cluster qualification level estimate;
    a client input configured to receive an incoming data item from a client device to be assigned to the incoming cluster;
    an edge reader configured to consult the bipartite graph to calculate at least one individual qualification level estimate between the incoming data item and at least one target data item;
    a report generator configured to generate a report ranking target data item options based on the at least one individual qualification level estimate; and
    a client output configured to send the report to the client device.

2. The non-transitory computer readable storage medium having the optimized search engine of claim 1, wherein the streamed clustering module is configured to identify an incoming cluster center for the incoming cluster.

3. The non-transitory computer readable storage medium having the optimized search engine of claim 2, wherein the streamed clustering module is configured to compare the incoming data item to the incoming cluster center.

4. The non-transitory computer readable storage medium having the optimized search engine of claim 3, wherein the streamed clustering module is configured to assign the incoming data item to the incoming cluster based upon an incoming center distance between the incoming data item and the incoming cluster center.

5. The non-transitory computer readable storage medium having the optimized search engine of claim 2, wherein the qualification level estimate module is configured to generate the cluster qualification level estimate between the incoming cluster center and a target cluster center of the target cluster.

6. The non-transitory computer readable storage medium having the optimized search engine of claim 5, wherein the qualification level estimate module is configured to generate the at least one individual qualification level estimate by multiplying a cluster qualification level estimate by a target center distance between the target data item and the target cluster center.

7. The non-transitory computer readable storage medium having the optimized search engine of claim 1, wherein the report generator is configured to generate a follow up report ranking target data item options triggered by an addition of a new target data item.

8. A computing device, having a memory to store a series of instructions that are executed by at least one processor to implement an optimized search engine, the computing device configured to
    receive an incoming data item from a client device describing aspects of a client user for matching purposes;

generate an incoming data object to represent the incoming data item;
identify a target cluster of a target object data set representing a target data item set;
read a cluster qualification level estimate for the target cluster in relation to the incoming data object;
calculate an individual qualification level estimate between the incoming data object and a target data object in the target cluster based on the cluster qualification level estimate;
generate a report ranking target data item options based on the individual qualification estimate; and
send the report to the client device.

9. The computing device of claim 8, wherein the computing device is further configured to
generate a new incoming cluster for the incoming data object when unassigned to an existing incoming cluster.

10. The computing device of claim 8, wherein the computing device is further configured to
compare the incoming data object to an incoming cluster center for an incoming cluster of an incoming data object set.

11. The computing device of claim 10, wherein the computing device is further configured to
assign the incoming data object to the incoming cluster based upon an incoming center distance between the incoming data object and the incoming cluster center.

12. The computing device of claim 11, wherein the computing device is further configured to
determine whether the incoming data object belongs to a new incoming cluster generated from the incoming cluster.

13. The computing device of claim 12, wherein the computing device is further configured to
set a tuning variable to calculate whether to create a new incoming cluster generated from the incoming cluster.

14. The computing device of claim 11, wherein the computing device is further configured to
merge the incoming cluster with a nearby incoming cluster.

15. The computing device of claim 14, wherein the computing device is further configured to
set a merging variable to calculate whether to merge the incoming cluster with the nearby incoming cluster.

16. The computing device of claim 14, wherein the computing device is further configured to
set a merger probability to equal a ratio of contentious data objects between two incoming clusters to total incoming data objects of the two incoming clusters.

17. A machine-implemented method, comprising:
receiving an incoming data item from a client device describing aspects of a client user for matching purposes;
generating an incoming data object to represent the incoming data item as a member of an incoming data object set representing an incoming data item set;
comparing the incoming data object to an incoming cluster center for an incoming cluster representing of the incoming data object set;
assigning the incoming data object to the incoming cluster based upon an incoming center distance between the incoming data object and the incoming cluster center;
identifying a target cluster of a target object data set representing a target data item set;
reading a cluster qualification level estimate between an incoming cluster center of the incoming cluster and a target cluster center of the target cluster;
calculating an individual qualification level estimate between the incoming data object and a target data object in the target cluster by multiplying the cluster qualification level estimate by a target center distance between the target data object and the target cluster center;
generating a report ranking target data item options based on the individual qualification estimate; and
sending the report to the client device.

18. The method of claim 17, further comprising:
calculating each incoming vector of the incoming data object in separate category calculations.

19. The method of claim 17, further comprising:
assigning a standardized score as a category score for an incoming vector.

20. The method of claim 17, further comprising:
appending a related category score to a category score for an incoming vector.

* * * * *